R. L. JENKINS.
RESILIENT TIRE.
APPLICATION FILED SEPT. 22, 1910.
1,053,821.
Patented Feb. 18, 1913.
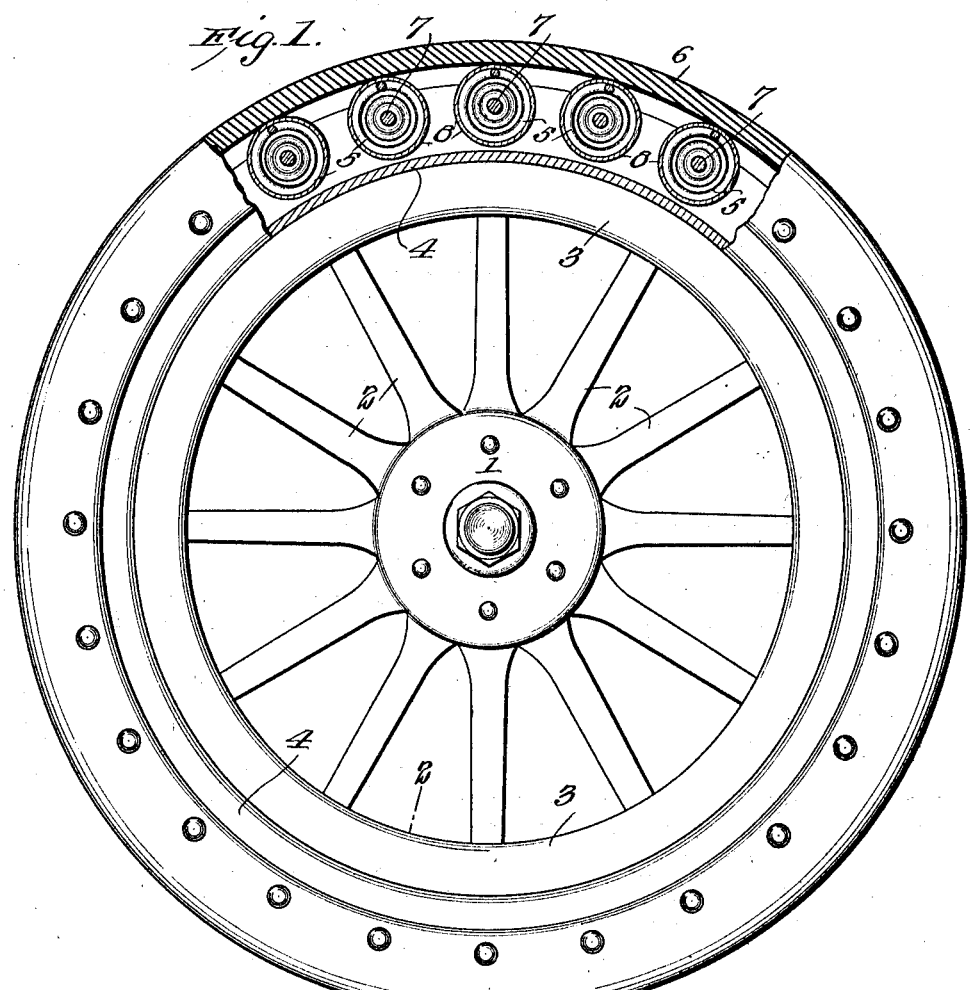
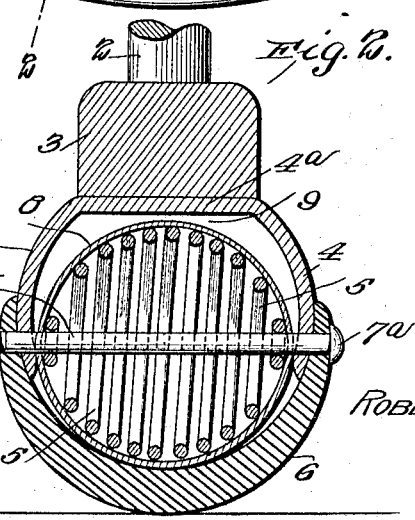
WITNESSES:
E. M. Callaghan
L. T. Stanley
INVENTOR
ROBERT L. JENKINS
BY Munn & Co.
ATTORNEYS

UNITED STATES PATENT OFFICE.

ROBERT L. JENKINS, OF RICHMOND, VIRGINIA, ASSIGNOR OF ONE-FOURTH TO LEE B. HANCOCK, OF RICHMOND, VIRGINIA.

RESILIENT TIRE.

1,053,821.  Specification of Letters Patent.  Patented Feb. 18, 1913.

Application filed September 22, 1910. Serial No. 583,223.

*To all whom it may concern:*

Be it known that I, ROBERT L. JENKINS, a citizen of the United States, and a resident of Richmond, in the county of Henrico and State of Virginia, have made certain new and useful Improvements in Resilient Tires, of which the following is a specification.

My invention relates to improvements in resilient tires, more particularly in those tires that are designed to be used on automobiles or other motor vehicles, and it consists in the combinations, constructions and arrangements herein described and claimed.

An object of my invention is to provide a resilient tire which shall take the place of the pneumatic tire in ordinary use, but which can be manufactured for much less cost and which is not subject to the danger of deflation due to punctures or blow-outs.

A further object of my invention is to provide a tire with coiled springs so arranged as to make the tire resilient and at the same time to stand the strain to which the tire will be subjected without permanent displacement.

Other objects and advantages will appear in the following specification and the novel features of the device will be particularly pointed out in the appended claim.

My invention is illustrated in the accompanying drawings, in which—

Figure 1 is a side view of a wheel equipped with my improved tire, a portion of the tire being shown in section, and Fig. 2 is a section along the line 2—2 of Fig. 1.

In carrying out my invention I make use of an ordinary hub 1 from which radiate the spokes 2, these spokes being held by the felly 3. To the periphery of the felly 3 is secured a steel rim 4 of the shape shown in Fig. 2, this rim being preferably shrunk onto the felly. As will be seen from this figure, the rim has a portion $4^a$ which fits closely the outer surface of the felly, and on each side an outwardly curved portion.

Within the trough formed by the rim is disposed a series of spiral springs 5. In Fig. 1 I have shown twelve spokes. Such a wheel would have twenty-four springs such as that shown in Fig. 2. An outer sheathing 6 of leather or other wear resisting material, is provided. The sides of the sheathing are brought up against the sides 4 of the rim and a bolt 7 secures the sheathing to the rim. The bolt 7 passes through the spring 5, the small end convolutions of the spring serving to maintain the latter in position. One end of the bolt is provided with a semi-cylindrical head $7^a$, while the opposite end of the bolt has a nut $7^b$ by means of which the sheathing may be clamped to the rim. Each of the springs 5 may be provided with a cover of leather or other resilient material such as that shown at 8, although it will be understood that this covering might be dispensed with.

From the foregoing description of the various parts of the device the operation thereof may be readily understood. As will be seen from Fig. 2, there is a space 9 between the inner side of the springs and the part $4^a$ of the rim, while the opposite side of the springs bears directly against the sheathing 6. The weight of the vehicle tends to push the spring transversely of the bolt, and the spring, being resilient, will give to some extent. Any end thrust is taken up by the head $7^a$ and the nut $7^b$. The head $7^a$ is intended to be on that side of the wheel next to the curb so as to prevent injury to the tire. The weight of the vehicle will bring a number of the springs into play so that the strain will be divided. The springs are held securely against displacement. The natural elasticity of the springs will keep the ends close to the sides of the rim so as to prevent any play, thereby doing away with rattling.

A tire constructed in this manner has resiliency but is of light weight, is not subject to puncture, and may be manufactured cheaply.

I claim:

The combination with a wheel, of a rim therefor having a trough-shaped periphery, a series of spiral springs disposed transversely at intervals between the sides of said rim, each of said springs being composed of large convolutions at the center of the spring and of progressively smaller convolutions toward the end of the spring, a wear resisting sheathing having sides arranged to extend without the outer surfaces of said trough-shaped rim, and a bolt arranged to extend through the sheathing, through the rim, and through the spiral spring, the end convolutions of the spring being in contact with and being carried by the bolt.

ROBERT L. JENKINS.

Witnesses:
 ORDWAY PULLEN,
 J. G. SMITH.

Copies of this patent may be obtained for five cents each, by addressing the "Commissioner of Patents, Washington, D. C."